United States Patent
Clowes et al.

(10) Patent No.: US 11,285,467 B2
(45) Date of Patent: *Mar. 29, 2022

(54) CATALYST ARTICLE AND THE USE THEREOF FOR FILTERING FINE PARTICLES

(71) Applicant: Johnson Matthey Public Limited Company, London (GB)

(72) Inventors: Lucy Clowes, Royston (GB); John Goodwin, Royston (GB); Fezile Lakadamyali, Wayne, PA (US); Alex Ravenscroft, Royston (GB); Chris Robson, Royston (GB); Sarah Warren, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/948,693

(22) Filed: Sep. 29, 2020

(65) Prior Publication Data

US 2021/0023543 A1   Jan. 28, 2021

Related U.S. Application Data

(63) Continuation-in-part of application No. 16/832,317, filed on Mar. 27, 2020.

(60) Provisional application No. 62/825,871, filed on Mar. 29, 2019.

(51) Int. Cl.

| | | |
|---|---|---|
| *B01D 53/86* | (2006.01) | |
| *B01J 23/10* | (2006.01) | |
| *B01J 23/42* | (2006.01) | |
| *B01J 23/44* | (2006.01) | |
| *B01J 23/46* | (2006.01) | |
| *B01J 35/00* | (2006.01) | |
| *C01G 25/02* | (2006.01) | |

(52) U.S. Cl.
CPC .......... *B01J 35/0013* (2013.01); *B01D 53/86* (2013.01); *B01J 23/10* (2013.01); *B01J 23/42* (2013.01); *B01J 23/44* (2013.01); *B01J 23/462* (2013.01); *B01J 35/006* (2013.01); *C01G 25/02* (2013.01); *B01D 2255/1021* (2013.01); *B01D 2255/1023* (2013.01); *B01D 2255/1026* (2013.01); *B01D 2255/407* (2013.01); *B01D 2255/92* (2013.01); *B01D 2258/01* (2013.01); *C01P 2004/62* (2013.01)

(58) Field of Classification Search
CPC ............ B01D 46/2418; B01D 53/9445; B01D 53/9454; B01D 2255/102; B01D 2255/407; B01D 2255/9022; B01D 2255/908; B01D 2255/9155; B01D 2258/012; B01D 2258/014; B01J 23/40; B01J 23/63; B01J 37/0215; F01N 3/035; F01N 3/101; F01N 2250/02; F01N 2250/12; F01N 2570/16

See application file for complete search history.

(56) References Cited

U.S. PATENT DOCUMENTS

| | | | |
|---|---|---|---|
| 8,815,189 B2* | 8/2014 | Arnold | B01D 46/2429 423/213.2 |
| 9,820,917 B1 | 11/2017 | Xu et al. | |
| 10,570,063 B1 | 2/2020 | Wiseman | |
| 2003/0007920 A1 | 1/2003 | Ota et al. | |
| 2009/0193796 A1 | 8/2009 | Wei et al. | |
| 2020/0306692 A1* | 10/2020 | Goodwin | B01J 23/63 |

FOREIGN PATENT DOCUMENTS

| | | | |
|---|---|---|---|
| CN | 1371867 A | 10/2002 | |
| GB | 2514875 A | 12/2014 | |
| WO | 2014125296 A1 | 8/2014 | |
| WO | WO 2014 125 296 A1 * | 8/2014 | ............. B01J 23/62 |
| WO | 2020161459 A1 | 8/2020 | |

* cited by examiner

*Primary Examiner* — Timothy C Vanoy (57) ABSTRACT

A catalyst article and its use in an exhaust system for internal combustion engines is disclosed. The catalyst article comprises a substrate which is a wall-flow filter, a first catalyst composition, and a second catalyst composition. The first and second catalyst compositions each independently comprise an oxygen storage component (OSC) derived from a CeZr mixed oxide sol having a D90 of less than 1.3 micron and a particulate inorganic oxide having a D90 of from 1 to 20 microns.

14 Claims, 2 Drawing Sheets

Figure 3

CATALYST ARTICLE AND THE USE THEREOF FOR FILTERING FINE PARTICLES

CROSS-REFERENCE TO RELATED APPLICATIONS

This application is a continuation-in-part of U.S. patent application Ser. No. 16/832,317, filed Mar. 27, 2020, which claims the benefit of U.S. Provisional Patent Application No. 62/825,971, filed Mar. 29, 2019, each of which is incorporated by reference herein in its entirety.

FIELD OF THE INVENTION

The present disclosure relates to a catalyst article for treating exhaust gas emissions from gasoline engines.

BACKGROUND OF THE INVENTION

Positive ignition engines cause combustion of a hydrocarbon and air mixture using spark ignition. In contrast, compression ignition engines cause combustion of a hydrocarbon by injecting the hydrocarbon into compressed air. Positive ignition engines can be fueled by gasoline fuel, gasoline fuel blended with oxygenates including methanol and/or ethanol, liquid petroleum gas or compressed natural gas. Positive ignition engines can be stoichiometrically operated engines or lean-burn operated engines.

A three-way catalyst (TWC) typically contains one or more platinum group metals, particularly those selected from the group consisting of platinum, palladium and rhodium. TWCs are intended to catalyse three reactions simultaneously: (i) oxidation of carbon monoxide to carbon dioxide; (ii) oxidation of unburned hydrocarbons to carbon dioxide and water; and, (iii) reduction of nitrogen oxides to nitrogen and oxygen.

These three reactions occur most efficiently when the TWC receives exhaust gas from an engine running at or about the stoichiometric point. As is well known in the art, the quantity of carbon monoxide (CO), unburned hydrocarbons (HC) and nitrogen oxides ($NO_x$) emitted when gasoline fuel is combusted in a positive ignition (e.g., spark-ignited) internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC and CO) are substantially matched. The air-to-fuel ratio that produces this stoichiometrically balanced exhaust gas composition is typically given as 14.7:1.

Theoretically, it should be possible to achieve complete conversion of $O_2$, $NO_x$, CO and HC in a stoichiometrically balanced exhaust gas composition to $CO_2$, $H_2O$ and $N_2$ (and residual $O_2$) and this is the duty of the TWC. Ideally, therefore, the engine should be operated in such a way that the air-to-fuel ratio of the combustion mixture produces the stoichiometrically balanced exhaust gas composition.

A way of defining the compositional balance between oxidising gases and reducing gases of the exhaust gas is the lambda (λ) value of the exhaust gas, which can be defined as the actual engine air-to-fuel ratio divided by the stoichiometric engine air-to-fuel ratio. A lambda (λ) value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates: hence stoichiometrically-operated gasoline engine or lean-burn gasoline engine.

It should be appreciated that the reduction of NOR to $N_2$ using a TWC is less efficient when the exhaust gas composition is lean of stoichiometric. Equally, the TWC is less able to oxidise CO and HC when the exhaust gas composition is rich. The challenge, therefore, is to maintain the composition of the exhaust gas flowing into the TWC at as close to the stoichiometric composition as possible.

Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

The active components in a typical TWC comprise one or both of platinum and palladium in combination with rhodium, or even palladium only (no rhodium), supported on a high surface area oxide, and an oxygen storage component.

When the exhaust gas composition is slightly rich of the set point, there is a need for a small amount of oxygen to consume the unreacted CO and HC, i.e., to make the reaction more stoichiometric. Conversely, when the exhaust gas goes slightly lean, the excess oxygen needs to be consumed. This was achieved by the development of the oxygen storage component (OSC) that liberates or absorbs oxygen during the perturbations. The most commonly used oxygen storage component in modern TWCs is cerium oxide ($CeO_2$) or a mixed oxide or a composite oxide containing cerium, e.g., a CeZr mixed oxide or a CeZr mixed oxide composite oxide.

In addition to the carbon monoxide (CO), unburned hydrocarbons (HC) and nitrogen oxides ($NO_x$) emitted when gasoline fuel is combusted in a positive ignition, all of which can be treated with the TWC catalyst, there are particulate matter (PM) emissions which need to be considered.

Ambient PM is divided by most authors into the following categories based on their aerodynamic diameter (the aerodynamic diameter is defined as the diameter of a 1 $g/cm^3$ density sphere of the same settling velocity in air as the measured particle): (i) PM-10, particles of an aerodynamic diameter of less than 10 μm; (ii) Fine particles of diameters below 2.5 μm (PM-2.5); (iii) Ultrafine particles of diameters below 0.1 μm (or 100 nm); and (iv) Nanoparticles, characterised by diameters of less than 50 nm.

Since the mid-1990's, particle size distributions of particulates exhausted from internal combustion engines have received increasing attention due to possible adverse health effects of fine and ultrafine particles. Concentrations of PM-10 particulates in ambient air are regulated by law in the USA. A new, additional ambient air quality standard for PM-2.5 was introduced in the USA in 1997 as a result of health studies that indicated a strong correlation between human mortality and the concentration of fine particles below 2.5 µm.

Interest has now shifted towards nanoparticles generated by diesel and gasoline engines because they are understood to penetrate more deeply into human lungs than particulates of greater size and consequently they are believed to be more harmful than larger particles, extrapolated from the findings of studies into particulates in the 2.5-10.0 µm range.

Size distributions of diesel particulates have a well-established bimodal character that correspond to the particle nucleation and agglomeration mechanisms. Diesel PM is composed of numerous small particles holding very little mass. Nearly all diesel particulates have sizes of significantly less than 1 µm, i.e., they comprise a mixture of fine, i.e., falling under the 1997 US law, ultrafine and nanoparticles.

It is understood that diesel particulate filters, such as ceramic wall-flow monoliths, may work through a combination of depth and surface filtration: a filtration cake develops at higher soot loads when the depth filtration capacity is saturated and a particulate layer starts covering the filtration surface. Depth filtration is characterized by somewhat lower filtration efficiency and lower pressure drop than the cake filtration.

PM generated by positive ignition engines has a significantly higher proportion of ultrafine, with negligible accumulation and coarse mode compared with that produced by diesel (compression ignition) engines, and this presents challenges to removing it from positive ignition engine exhaust gas in order to prevent its emission to atmosphere. In particular, since a majority of PM derived from a positive ignition engine is relatively small compared with the size distribution for diesel PM, it is not practically possible to use a filter substrate that promotes positive ignition PM surface-type cake filtration because the relatively low mean pore size of the filter substrate that would be required would produce impractically high backpressure in the system.

Furthermore, generally it is not possible to use a conventional wall-flow filter, designed for trapping diesel PM, for promoting surface-type filtration of PM from a positive ignition engine in order to meet relevant emission standards because there is generally less PM in positive ignition exhaust gas, so formation of a soot cake is less likely; and positive ignition exhaust gas temperatures are generally higher, which can lead to faster removal of PM by oxidation, thus preventing increased PM removal by cake filtration. Depth filtration of positive ignition PM in a conventional diesel wall-flow filter is also difficult because the PM is significantly smaller than the pore size of the filter medium. Hence, in normal operation, an uncoated conventional diesel wall-flow filter will have a lower filtration efficiency when used with a positive ignition engine than a compression ignition engine.

Emission legislation in Europe from Sep. 1, 2014 (Euro 6) requires control of the number of particles emitted from both diesel and gasoline (positive ignition) passenger cars. For gasoline EU light duty vehicles the allowable limits are: 1000 mg/km carbon monoxide; 60 mg/km nitrogen oxides ($NO_x$); 100 mg/km total hydrocarbons (of which 68 mg/km are non-methane hydrocarbons); and 4.5 mg/km particulate matter for direct injection engines only). A PM number standard limit of $6.0 \times 10^{11}$ per km has been set for Euro 6, although an Original Equipment Manufacturer may request a limit of $6 \times 10^{12}$ $km^{-1}$ until 2017. In a practical sense, the range of particulates that are legislated for are between 23 nm and 3 µm.

In the United States, on Mar. 22, 2012, the State of California Air Resources Board (CARB) adopted new Exhaust Standards from 2017 and subsequent model year "LEV III" passenger cars, light-duty trucks and medium-duty vehicles which include a 3 mg/mile emission limit, with a later introduction of 1 mg/mile possible, as long as various interim reviews deem it feasible.

The new Euro 6 emission standard presents several challenging design problems for meeting gasoline emission standards. In particular, how to design a filter, or an exhaust system including a filter, for reducing the number of PM gasoline (positive ignition) emissions, yet at the same time meeting the emission standards for non-PM pollutants such as one or more of oxides of nitrogen ($NO_x$), carbon monoxide (CO) and unburned hydrocarbons (HC), all at an acceptable back pressure, e.g., as measured by maximum on-cycle backpressure on the EU drive cycle.

There have been several recent efforts to combine TWCs with filters for meeting the Euro 6 emission standards.

WO2014125296 discloses a positive ignition engine comprising an exhaust system for a vehicular positive ignition internal combustion engine. The exhaust system comprises a filter for filtering particulate matter from exhaust gas emitted from the vehicular positive ignition internal combustion engine coated with a three-way catalyst washcoat. The washcoat comprises a platinum group metal and a plurality of solid particles, wherein the plurality of solid particles comprises at least one base metal oxide and at least one oxygen storage component which is a mixed oxide or composite oxide comprising cerium. The mixed oxide or composite oxide comprising cerium and/or the at least one base metal oxide has a median particle size (D50) less than 1 µm.

US20090193796 discloses an emission treatment system downstream of a gasoline direct injection engine for treatment of an exhaust gas comprising hydrocarbons, carbon monoxide, nitrogen oxides and particulates, the emission treatment system comprising a catalysed particulate trap comprising a TWC catalyst coated onto or within a particulate trap. In the description and Examples provided, a catalyst coating (also referred to as a layer or layered catalyst composite) is prepared from a slurry mixture of a solution of desired precious metal compounds and at least one support material, such as finely divided, high surface area, refractory metal oxide. The slurry mixture is comminuted, e.g., in a ball mill or other similar equipment, to result in substantially all the solids having particle sizes of less than about 20 µm, i.e., between about 0.1-15 µm in an average diameter (known as "D50"). In the Examples, comminution by milling of alumina was done so that the particle size of 90% (known as "D90") of the particles was 8-10 µm. Comminution of a ceria-zirconia composite was done by milling to a D90 particle size of <5 µm.

In GB2514875 the inventors considered the use of washcoat compositions comprising milled Ce/Zr mixed oxides for use in three-way catalysts for coating filters, such as those disclosed in US 20090193796, for low back-pressure applications. Here it was found that by milling Ce/Zr mixed oxides, although the backpressure decreased with decreasing D50 of the cerium/zirconium mixed oxide, simultaneously, the three-way catalyst activity was significantly reduced, particularly for CO and $NO_x$ emissions.

Accordingly, it is an object to provide an improved TWC catalyst filter tackling the disadvantages of the prior art, or at least to provide a commercially useful alternative thereto. More specifically, it is an object to provide a catalyst article that enables treatment of exhaust gas to address fine sub-23 nm particulate emissions.

The present inventors found that the problem of reduced three-way catalyst activity observed in GB2514875 can be addressed. They also found that back pressure can also be reduced to desirable levels by the careful selection of the particle sizes of the cerium/zirconium mixed oxide component and the inorganic oxide materials such as alumina.

The advantage of this discovery is clear in addressing the associated health risks with ultrafine soot particles mentioned above and well referenced and discussed recently in the International Journal of Environmental Research and Public Health (*Int. J. Environ. Res. Public Health* 2018, 15, 304). Indeed, the global acceptance of ultrafine particles and the impact on cardiorespiratory and central nervous system health issues has driven the tightening of global legislative limits for automotive applications. Beyond today's emissions limits, legislators look to further improve air quality and one area for consideration is particulate matter, currently measured as PN or Particulate Number for Euro 6d standards.

Currently the measurement requirement of PN is for particles of 23 nm or greater. One obvious aspect to consider tightening legislation as measurement accuracy improves, is to consider the particle sizes below 23 nm. The described invention therefore lends itself to solving the technical challenge of anticipated tightening of particulate emissions legislation beyond Euro6d and bringing about the desired health benefits of reducing ultrafine particles into the atmosphere.

SUMMARY OF THE INVENTION

One aspect of the present disclosure is directed to a catalyst article for treating an exhaust gas from a positive-ignition internal-combustion engine, the article comprising: a substrate which is a wall-flow filter having an inlet end and an outlet end and an axial length L therebetween, a plurality of inlet channels extending from the inlet end and a plurality of outlet channels extending from the outlet end, wherein the plurality of inlet channels comprise a first catalyst composition extending from the inlet or outlet end for at least 50% of L and the plurality of outlet channels comprise a second catalyst composition extending from the outlet or inlet end for at least 50% of L, wherein the first and second catalyst compositions overlap by at most 80% of L; wherein the first and second catalyst compositions each independently comprise an oxygen storage component (OSC) derived from a CeZr mixed oxide sol having a D90 of less than 1.3 micron and a particulate inorganic oxide having a D90 of from 1 to 20 microns.

Another aspect of the present disclosure is directed to an exhaust gas treatment system comprising the catalyst article of the invention in fluid communication with an exhaust manifold of a positive ignition engine Another aspect of the present disclosure is directed to a method of treating exhaust gas emitted from a positive ignition internal combustion engine, the method comprising contacting the exhaust gas with the catalyst article of the invention.

Another aspect of the present disclosure is directed to the use of the catalyst article of the invention in an exhaust gas treatment system for reducing the emission of particles smaller than 23 nm.

DETAILED DESCRIPTION OF THE INVENTION

One aspect of the present disclosure is directed to a catalyst article for treating an exhaust gas from a positive-ignition internal-combustion engine, the article comprising: a substrate which is a wall-flow filter having an inlet end and an outlet end and an axial length L therebetween, a plurality of inlet channels extending from the inlet end and a plurality of outlet channels extending from the outlet end, wherein the plurality of inlet channels comprise a first catalyst composition extending from the inlet or outlet end for at least 50% of L and the plurality of outlet channels comprise a second catalyst composition extending from the outlet or inlet end for at least 50% of L, wherein the first and second catalyst compositions overlap by at most 80% of L; wherein the first and second catalyst compositions each independently comprise an oxygen storage component (OSC) derived from a CeZr mixed oxide sol having a D90 of less than 1.3 micron and a particulate inorganic oxide having a D90 of from 1 to 20 microns.

In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The catalyst article comprises a substrate which is a wall-flow filter having an inlet end and an outlet end and an axial length L therebetween, a plurality of inlet channels extending from the inlet end and a plurality of outlet channels extending from the outlet end. Wall-flow filters are well known in the art and typically comprise a ceramic porous filter structure having a plurality of inlet channels and a plurality of outlet channels, wherein each inlet channel and each outlet channel is defined in part by a ceramic wall of porous structure, wherein each inlet channel is separated from an outlet channel by a ceramic wall of porous structure.

Typical lengths L are 2-12 inches long (5.1-30.5 cm), preferably 3-6 inches (7.6-15.2 cm) long. Cross sections are preferably circular and may typically have 4.66 and 5.66 inch (11.8 cm and 14.4 cm) diameter filters. However, cross-section can also be dictated by space on a vehicle into which the filter is required to fit.

The substrate can be a ceramic, e.g., silicon carbide, cordierite, aluminium nitride, silicon nitride, aluminium titanate, alumina, mullite, e.g., acicular mullite (see e.g., WO 01/16050), pollucite, a thermet such as $Al_2O_3/Fe$, or composites comprising segments of any two or more thereof. In embodiments wherein the catalyst article of the present comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

The substrate suitable for use in the present invention typically has a porosity of >40% or >50% and porosities of 45-75% such as 50-65% or 55-60% can advantageously be used. Porosity is a measure of the percentage of void space in a substrate and is related to backpressure in an exhaust system. Generally, the lower the porosity, the higher the backpressure.

The substrate suitable for use in the present invention typically has a mean pore size of surface pores of from 8 to 45 μm, for example 8 to 25 μm, 10 to 20 μm, or 10 to 15 μm. Pore size is well known in the art and appropriate measurement techniques are known to the person skilled in the art.

Each of the first and second catalyst compositions independently comprises an oxygen storage component (OSC) derived from a CeZr mixed oxide sol having a D90 of less than 1.3 micron and a particulate inorganic oxide having a D90 of from 1 to 20 microns.

Particle size distributions can be characterized by the D10, D50 and D90 measurements. In each case the number indicates the percentage amount of particles smaller than the recited value. In other words, a D90 of 100 microns means that 90% of the particles are smaller than 100 microns in diameter. By knowing a D10 and a D90, the range of particles in a distribution of particles can be defined. The characterization of the particle size of a sample by its D10 and D90 values generally defines the breadth of the particle-size distribution. The closer these values are, the narrower the distribution of particle sizes.

The particle size measurements necessary to obtain D10, D50 and D90 values of the CeZr mixed oxide sol and/or the particulate inorganic oxide can be obtained by Laser Diffraction Particle Size Analysis using a Malvern Mastersizer 2000, which is a volume-based technique (i.e. D50 and D90 may also be referred to as Dv50 and Dv90 (or D(v,0.50) and D(v,0.90)) and applies a mathematical Mie theory model to determine a particle size distribution. The laser diffraction system works by determining diameters for the particles based on a spherical approximation. For the particle size measurements by Laser Diffraction Particle Size Analysis, diluted samples were prepared by sonication in distilled water without surfactant for 30 seconds at 35 watts.

In some embodiments, the D90 of the CeZr mixed oxide sol may be less than 1.2 micron, or less than 1.1 micron, or less than 1.0 micron, or less than 900 nm, or less than 800 nm, or less than 700 nm, or less than 600 nm, or less than 500 nm, or less than 400 nm, or less than 300 nm.

In some other embodiments, the D90 of the CeZr mixed oxide sol may be between 1.2 micron and 1.3 micron, or between 1.1 micron and 1.2 micron, or between 1.0 micron and 1.1 micron, or between 900 nm and 1.0 micron, or between 800 nm and 900 nm, or between 700 nm and 800 nm, or between 600 nm and 700 nm, or between 500 nm and 600 nm, or between 400 nm and 500 nm, or between 300 nm and 400 nm, or between 200 nm and 300 nm, or between 100 nm and 200 nm.

The CeZr mixed oxide sol may have a D50 of between 100 nm and 700 nm, preferably between 200 nm and 600 nm, more preferably between 300 nm and 400 nm.

The particle size can also be characterized by obtaining a Z-average particle size of a sample. The Z average is the intensity weighted mean hydrodynamic size of the ensemble collection of particles measured by dynamic light scattering (DLS). The Z-average is derived from a cumulants analysis of the measured correlation curve, wherein a single particle size is assumed and a single exponential fit is applied to the autocorrelation function. The particle size measurements necessary to obtain Z-average particle size of the CeZr mixed oxide sol and/or the particulate inorganic oxide can be obtained by Dynamic Light Scattering Particle Size Analysis using a Malvern Zetasizer Nano. All tests are performed in a dilute aqueous medium where the harmonic mean hydrodynamic diameter of a sphere of equivalent diffusivity is determined by cumulants analysis of the time dependency of light scattered by randomly moving particles, in accordance with the Stokes-Einstein Equation.

The Z-average particle size of the CeZr mixed oxide sol is preferably between 150 nm and 350 nm, more preferably between 230 and 310 nm.

The CeZr mixed oxide sol comprise a CeZr mixed oxide (CeZr mixed oxide particles or CeZr mixed oxide nanoparticles) dispersed in an aqueous medium. The CeZr mixed oxide comprises ceria and zirconia. Although nominally described as "ceria" or "cerium dioxide" and "zirconia" or "zirconium oxide", it is understood by one skilled in the arts, that the actual oxidic anions present may comprise oxide anions or hydroxide anions, or mixtures thereof, such as hydrated oxide phases (e.g., oxyhydroxide).

Preferably, the concentration of the CeZr mixed oxide in the CeZr mixed oxide sol is in range of from 10 to about 50 weight percent ("wt %"), more preferably from 15 to about 45 wt %, most preferably from 20 to about 40 wt % relative to the weight of the CeZr mixed oxide sol.

The CeZr mixed oxide present in the CeZr mixed oxide sol may preferably comprise ceria in an amount of about 5 to about 60 wt % relative to the total weight of the CeZr mixed oxide, more preferably in an amount of about 10 to about 50 wt %, most preferably in an amount of about 30 to about 40 wt %.

The CeZr mixed oxide present in the sol may preferably comprise zirconia in an amount of about 10 to about 75 wt % relative to the total weight of the CeZr mixed oxide, more preferably in an amount of about 30 to about 70 wt %, most preferably in an amount of about 50 to about 65 wt %.

In one embodiment, the CeZr mixed oxide sol has a weight ratio of $ZrO_2$ to $CeO_2$ of about 2:1.

The CeZr mixed oxide present in the sol may comprise a rare earth oxide other than ceria. The rare earth oxide in the CeZr mixed oxide is selected from the group consisting of oxides of dysprosium (Dy), erbium (Er), europium (Eu), gadolinium (Gd), holmium (Ho), lanthanum (La), lutetium (Lu), neodymium (Nd), praseodymium (Pr), samarium (Sm), scandium (Sc), terbium (Tb), thulium (Tm), ytterbium (Yb), yttrium (Y), and mixtures thereof. The CeZr mixed oxide preferably comprises an oxide of La, Nd, Pr, or Y, or mixtures thereof, more preferably an oxide of La or Nd, or mixtures thereof.

The amount of the rare earth oxide(s) in the CeZr mixed oxide in the CeZr mixed oxide sol may preferably be in an amount of about 1 to about 25 wt % relative to the total weight of the CeZr mixed oxide, more preferably in an amount of about 2 to about 20 wt %, most preferably in an amount of about 5 to about 15 wt %.

The CeZr mixed oxide present in the CeZr mixed oxide sol may comprise a transition metal oxide. The transition metal present in CeZr mixed oxide is preferably selected from the group consisting of titanium (Ti), hafnium (Hf), vanadium (V), chromium (Cr), iron (Fe), cobalt (Co), nickel (Ni), copper (Cu), zinc (Zn), and mixtures thereof. More preferably, the transition metal is preferably selected from the group consisting of Ti, Hf, and mixture thereof. Most preferably, the transition metal is Hf.

The CeZr mixed oxide sol suitable for the invention may be prepared by known techniques. See, e.g., WO2020161459; U.S. Pat. Nos. 10,570,063; 9,820,917; CN1371867A; H. He, *Integrated Ferroelectrics*, 161:1, 36-44; J. J. Gulicovski, S. K. Milonjić & K. Mészáros Szécsényi Synthesis and Characterization of Stable Aqueous Ceria Sols, *Materials and Manufacturing Processes*, 24:10-11, 2009, 1080-1085.

The particulate inorganic oxide used in the present invention is preferably an oxide of Groups 2, 3, 4, 5, 13 and 14 elements. The particulate inorganic oxide is preferably selected from the group consisting of alumina, magnesia, lanthana, silica, neodymium, praseodymium, yttrium oxides, titania, niobia, tantalum oxides, molybdenum oxides, tungsten oxides, and mixed oxides or composite oxides thereof. More preferably, the particulate inorganic oxide is selected from the group consisting of alumina, magnesia, silica, lanthanum, neodymium, praseodymium, yttrium oxides, and mixed oxides or composite oxides thereof. Particularly preferably, the particulate inorganic oxide is alumina, a lanthanum/alumina composite oxide, or a magnesia/alumina composite oxide. One especially preferred particulate inorganic oxide is a lanthanum/alumina composite oxide.

Preferably, the particulate inorganic oxide has a surface area of at least 80 $m^2/g$, more preferably at least 150 $m^2/g$, and most preferably at least 200 $m^2/g$.

Generally, the particulate inorganic oxide has a D90 of from 1 to 20 microns. Preferably the particulate inorganic oxide has a D90 of from 5 to 20 microns. More preferably the particulate inorganic oxide has a D90 of from 5 to 15 microns.

The first and second catalyst compositions are preferably both TWC compositions. TWC compositions are well known in the art and the specific components may readily be selected by a person skilled in the art. The TWC typically comprises one or more platinum group metals (PGM) provided on a high surface area support (i.e. the inorganic oxide), together with an oxygen storage component (OSC). TWC compositions are generally provided in washcoats onto the substrate.

Preferably the first and/or second catalyst composition have a weight ratio of the OSC (mixed oxide derived from the CeZr mixed oxide sol) to the particulate inorganic oxide of from 10:1 to 1:10, preferably from 3:1 to 1:3. Preferably the loading of the OSC in each composition is from 0.5 to 4 $g/in^3$, preferably from 1 to 3 $g/in^3$.

Preferably the first and/or second catalyst composition further comprises a platinum group metal (PGM) component, preferably selected from the group consisting of platinum, palladium, rhodium, and a mixture thereof.

When a PGM component is present in the first and/or second catalyst composition, the PGM component is preferably supported on the particulate inorganic oxide.

The first and/or second catalyst composition may comprise from 1 to 100 $g/ft^3$ of the PGM component, preferably, from 5 to 80 $g/ft^3$, more preferably, from 10 to 50 $g/ft^3$ of the PGM component.

The first and/or second catalyst composition may further comprises an alkali or alkaline earth metal component. Preferably the first and/or second catalyst composition comprises barium or strontium. Preferably the barium or strontium, where present, is present in an amount of 0.1 to 15 wt %, and more preferably 3 to 10 wt %, based on the total weight of the first and or second catalyst compositions. Preferably the barium is present as a $BaCO_3$ composite material. Such a material can be performed by any method known in the art, for example incipient wetness impregnation or spray-drying.

The catalyst article of the invention may comprise other components that are known to the skilled person. For example, the first and/or second catalyst composition may further comprise at least one binder and/or at least one surfactant. Where a binder is present, dispersible alumina binders are preferred.

Preferably the first and second catalyst compositions are substantially the same. Although the compositions may be the same, the loading may differ. Preferably, the first and second catalyst compositions may be the same, in order to reduce manufacturing complexity.

The first and second catalyst compositions may be coated to the substrate by a washcoating step. A washcoat slurry comprising the CeZr mixed oxide sol, the particulate inorganic oxide, and other components such as PGM if used, and an appropriate solvent, preferably water, is prepared. Additional components, such as binders, stabilizers, or promoters may also be incorporated. The slurry preferably contains between about 10 wt % to about 70 wt % solid materials, more preferably between about 20 wt % to about 50 wt %.

Many techniques may be used to coat the substrate with the washcoat slurry.

In one method of washcoating, the substrate may then be dipped one or more times into the washcoat slurry or the slurry may be coated on the substrate such that there will be deposited on the substrate the desired loading of the composition. The washcoat slurry may at least partially infiltrate the pores of the substrate during the coating, depending on the particle size and viscosity of the washcoat slurry.

When coating with techniques such as Johnson Matthey's precision coating process described in WO 1999/47260, which relies on vacuum or pressure drawing of the washcoat into the substrate, it is possible to apply coatings on the inlet end of the outlet channels and the outlet end of the inlet channels. This technique provides washcoat within the pores of the substrate, but also draws material through to provide an on-wall coating on the opposite side of the substrate from where it was applied.

After the substrate has been coated with the first and second compositions, the coated substrate is preferably dried and then calcined by heating at an elevated temperature to form the catalyst article. Preferably, the calcination occurs at about 400° C. to about 600° C. for approximately about 1 to about 8 hours.

According to the present invention, the plurality of inlet channels of the catalyst article comprises the first catalyst composition extending from the inlet or the outlet end for at least 50% of L and the plurality of outlet channels comprise the second catalyst composition extending from the outlet or the inlet end for at least 50% of L. The first and second catalyst compositions overlap by at most 80% of L. Preferably the first and second catalyst compositions overlap by at most 20% of L and more preferably by at most 10% of L. One of the first and second compositions may provide a complete coating of the plurality of inlet or outlet channels.

When the overlap is at most 20%, the first catalyst composition may be provided on the inlet channel extending from the inlet end by a distance of at least 50% of L and at most 70%, while the second catalyst composition may be provided on the outlet channel extending from the outlet end by a distance of at least 50% and at most 70%. Since the overlap is at most 20%, when the first catalyst composition is, for example 70%, the second catalyst composition can only extend to 50%.

Preferably the first and/or second catalyst compositions are provided directly on the substrate.

The location of the first and second compositions coated on the substrate will depend on the coating technique used. The first and second compositions coated on the substrate may be in-wall, on-wall, or a combination of in-wall and on-wall. Preferably, at least a portion of the coating is provided on-wall.

In one embodiment, the inlet channels and/or the outlet channels of the wall-flow filter have an on-wall wedge-shaped profile, wherein a thickest end of the wedge is at the plug end of the channel and washcoat is also present in-wall. This arrangement is different from Applicant's WO2017/056067. WO2017/056067 discloses a catalytic wall-flow filter comprising a three-way catalyst washcoat arranged on-wall in a "wedge" shape when the wall-flow filter is viewed in longitudinal section. That is, the thickness of the on-wall coating tapers from a thickest end at an open channel end of the wall-flow filter.

When coating with a vacuum infiltration method, such as disclosed in WO 1999/47260 using conditions that "pull" the particles in the washcoat from a side of the wall in the wall-flow filter construction onto which the washcoat composition is first contacted through the porous filter wall so that some of them rest on-wall on the opposite (second) side of the wall.

Another aspect of the present disclosure is an exhaust gas treatment system comprising the catalyst article as described herein in fluid communication with an exhaust manifold of a positive ignition engine.

As desired, the exhaust system can also include additional components. For example, in exhaust systems applicable particularly to lean-burn engines, a $NO_x$ trap can be disposed upstream of the catalyst article described. A $NO_x$ trap, also known as a $NO_x$ absorber catalysts (NACs), are known e.g., from U.S. Pat. No. 5,473,887 and are designed to adsorb nitrogen oxides ($NO_x$) from lean (oxygen rich) exhaust gas (lambda>1) during lean running mode operation and to desorb the $NO_x$ when the oxygen concentration in the exhaust gas is decreased (stoichiometric or rich running modes). Desorbed $NO_x$ may be reduced to $N_2$ with a suitable reductant, e.g., gasoline fuel, promoted by a catalyst component, such as rhodium or ceria, of the NAC itself or located downstream of the NAC.

As desired, after leaving the catalyst article described herein, optionally the exhaust gas stream can next be conveyed via an appropriate exhaust pipe to a downstream $NO_x$ trap for adsorbing any remaining $NO_x$ emission contaminants in the exhaust gas stream. From the $NO_x$ trap through a further exhaust pipe, a SCR catalyst can be disposed to receive the outlet of the $NO_x$ trap to provide further emissions treatment of any ammonia generated by the $NO_x$ trap with a selective catalytic reduction catalyst for reducing oxides of nitrogen to form nitrogen and water using the ammonia as reductant. From the SCR catalyst, an exhaust pipe can lead to the tail pipe and out of the system.

Another aspect of the present disclosure is a method of treating exhaust gas emitted from a positive ignition internal combustion engine, the method comprising contacting the exhaust gas with the catalyst article as described herein. Preferably the engine is a lean-burn gasoline engine. Additionally, the present disclosure can comprise a vehicle, such as a passenger vehicle, comprising an engine as described herein.

Another aspect of the present disclosure is the use of the catalyst article as described herein in an exhaust gas treatment system for reducing the emission of particles smaller than 23 nm, in particular for reducing the emission of particles from 10 to 23 nm. Preferably the use of the catalyst article reduces the emission of particles smaller than 23 nm by at least 20 percent by number; more preferably, at least 30 percent by number; and even more preferably, at least 40 percent by number.

Another aspect of the present disclosure is a method of treating exhaust gas emitted from a positive ignition internal combustion engine, the method comprising contacting the exhaust gas with the catalyst article as described herein, wherein the method is for reducing the emission of particles smaller than 23 nm, in particular for reducing the emission of particles from 10 to 23 nm.

Another aspect of the present disclosure is the use of the catalyst article in an exhaust gas treatment system for reducing the emission of particles smaller than 23 nm, in particular for reducing the emission of particles from 10 to 23 nm.

The term "washcoat" is well known in the art and refers to an adherent coating that is applied to a substrate usually during production of a catalyst.

The acronym "PGM" as used herein refers to "platinum group metal." The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The term "loading" as used herein refers to a measurement in units of $g/ft^3$ on a metal weight basis, unless other units are provided.

The invention will now be described in relation to the following non-limiting figures.

Figure 1:
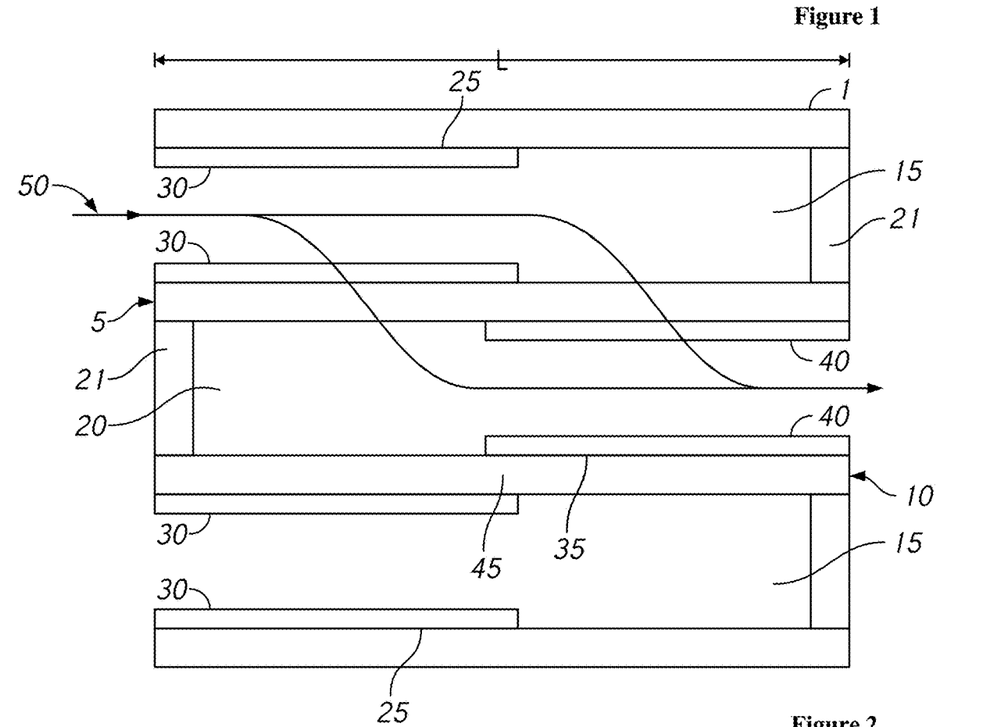
FIG. 1 shows a schematic of one example of wall-flow filter as described herein.

FIG. 1 shows one example of the invention. FIG. 1 shows a cross-section through a wall-flow filter 1 made of a porous cordierite substrate. The wall-flow filter 1 has a length L extending between the inlet end 5 and the outlet end 10. The wall-flow filter 1 comprises a plurality of inlet channels 15 and a plurality of outlet channels 20 (only one shown). The plurality of inlet channels 15 and outlet channels 20 are plugged at their respective ends with plugs 21.

The internal surfaces 25 of the inlet channels 15 have been coated with an on-wall coating 30 comprising a first catalyst composition. The coating 30 extends at least 50% of L from the inlet end 5 and has roughly uniform thickness along the length of the channel.

The internal surfaces 35 of the outlet channels 20 have been coated with an on-wall coating 40 comprising a second catalyst composition. The coating 40 extends at least 50% of L from the outlet end 10 and has roughly uniform thickness along the length of the channel.

The overlap region 45 between coatings 30 and 40 is less than or equal to 20% of L.

In use, an exhaust gas flow 50 (shown with the arrows) passes into the inlet channels 15, through the walls of the wall-flow filter 1, and out of the outlet channels 20.

Figure 2:
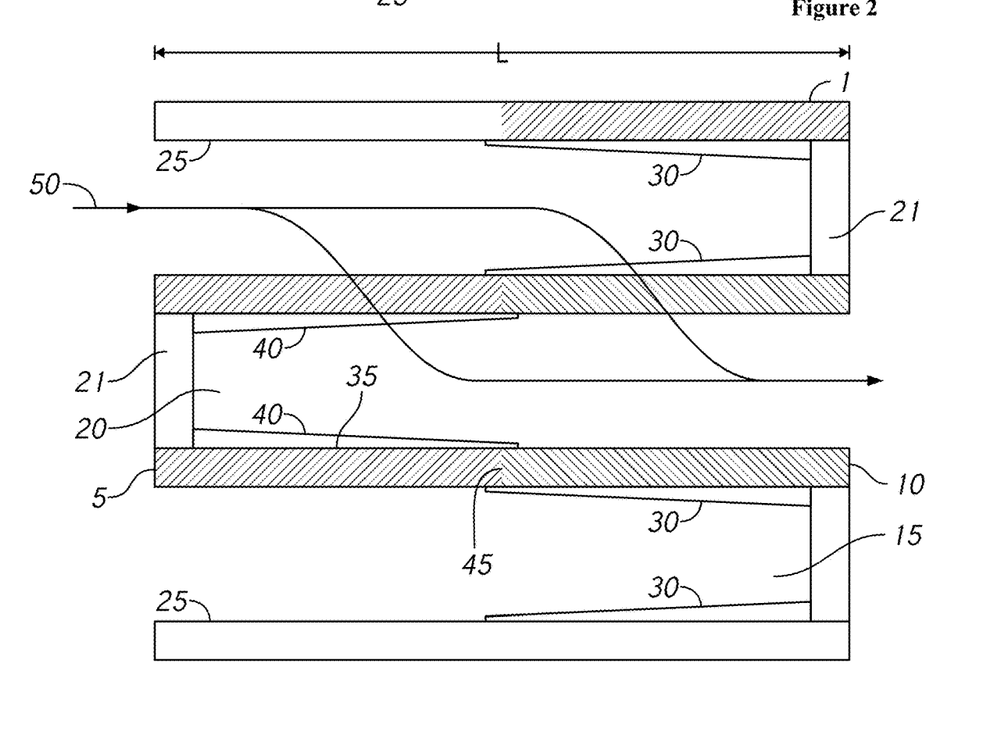
FIG. 2 shows a schematic of another example of wall-flow filter as described herein.

FIG. 2 shows another example of the invention. FIG. 2 shows a cross-section through a wall-flow filter 1 made of a porous cordierite substrate. The wall-flow filter 1 has a length L extending between the inlet end 5 and the outlet end 10. The wall-flow filter 1 comprises a plurality of inlet channels 15 and a plurality of outlet channels 20 (only one shown). The plurality of inlet channels 15 and outlet channels 20 are plugged at their respective ends with plugs 21.

The internal surfaces 25 of the inlet channels 15 have been coated with an on-wall coating 30 comprising a first catalyst composition. In addition, the first catalyst composition is also present in the wall structure of the inlet channels 15. The coating 30 extends at least 50% of L from the outlet end 10. The coating 30 is wedge-shaped with a thicker amount at the outlet end 10. The coating 30 is applied in accordance with the method of WO 1999/47260.

The internal surfaces 35 of the outlet channels 20 have been coated with an on-wall coating 40 comprising a second catalyst composition. In addition, the second catalyst composition is also present in the wall structure of the outlet channels 20. The coating 40 extends at least 50% of L from the inlet end 5. The coating 40 is wedge-shaped with a thicker amount at the inlet end 5. The coating 40 is applied in accordance with the method of WO 1999/47260.

The overlap region 45 between coatings 30 and 40 is less than or equal to 20% of L.

In use, an exhaust gas flow 50 (shown with the arrows) passes into the inlet channels 15, through the walls of the wall-flow filter 1, and out of the outlet channels 20.

The invention will now be described in relation to the following non-limiting examples.

Materials

All materials are commercially available and were obtained from known suppliers, unless noted otherwise.

Example 1

A three way catalyst washcoat was prepared at a washcoat loading of 1.6 g/in$^3$ that include 1.2 g/in$^3$ CeZr mixed oxide (OSC) derived from a CeZr mixed oxide sol having a weight ratio of $ZrO_2$ to $CeO_2$ of about 2:1 and a D90 of <1 μm and 0.4 g/in$^3$ La-stabilized alumina component having a D90 of 12 μm. The PGM loading was 22 g/ft$^3$ (Pt:Pd:Rh, 0:20:2)

The completed washcoat slurry was adjusted to a suitable final washcoat solids content of about 24% in order to coat onto the GPF substrate using Johnson Matthey's precision coating process described in WO 1999/47260. The substrate used was a commercially available cordierite GPF substrate of a nominal 63% porosity and 17.5 μm mean pore size and of dimensions 4.66 inch diameter by 6 inch in length, 300 cells per square inch and a channel wall thickness of 8 thousandths of an inch. The coating was applied from each end of the substrate with each application covering a length between of 58% of the total substrate length to achieve a fully coated final product with no uncoated region (16% overlap). The amounts of washcoat slurry were applied to the inlet channels and the outlet channels are the same. The coated substrate was then dried and calcined in the normal way known to the art. The product profile is shown in FIG. 2.

Example 2

Example 2 was prepared in the same way as Example 1 except that the La-stabilized alumina component had a D90 of 5 μm.

Comparative Example 3

A reference coated GPF was prepared by applying a current state of art TWC coating developed for GPF substrate. The washcoat loading was prepared at 1.6 g/in$^3$ that includes 1.2 g/in$^3$ OSC component (CeZr mixed oxide particles, not derived from a sol), 0.4 g/in$^3$ La-stabilized alumina component, and a PGM loading 22 g/ft$^3$ (Pt:Pd:Rh, 0:20:2). In contrast to Examples 1 and 2, here both the OSC component and La-stabilized alumina component have a D90 of ~7 μm.

Uncoated 220/6 Reference GPF

For the purposes of further comparison to the invention, an uncoated GPF reference has been used. This is a commercially available GPF substrate which may be considered for use in such aftertreatment systems for Euro 6 PN limit of $6 \times 10^{11}$. The same catalyst diameter and length and therefore catalyst volume was selected as in Examples 1-3, 4.66" diameter and 6" length. However, to achieve the required filtration efficiency, such bare filters require lower nominal porosity and mean pore size. Since this can cause an undesirable increase in backpressure, the cells per square inch and wall thickness are typically lower than the substrates which are designed to be coated with a washcoat. The uncoated reference GPF was of 220 cells per square inch and having a wall thickness of 6 thousandths of an inch.

Filtration Performance Evaluation

The above samples were evaluated for particulate emissions and specifically those between 10-23 nm. The evaluation was carried out over a simulated WLTC performed on an engine bench equipped with a 2.0 L Gasoline Direct Injection engine. The particles are measured using a Combustion DMS500 particle analyser.

Figure 3:
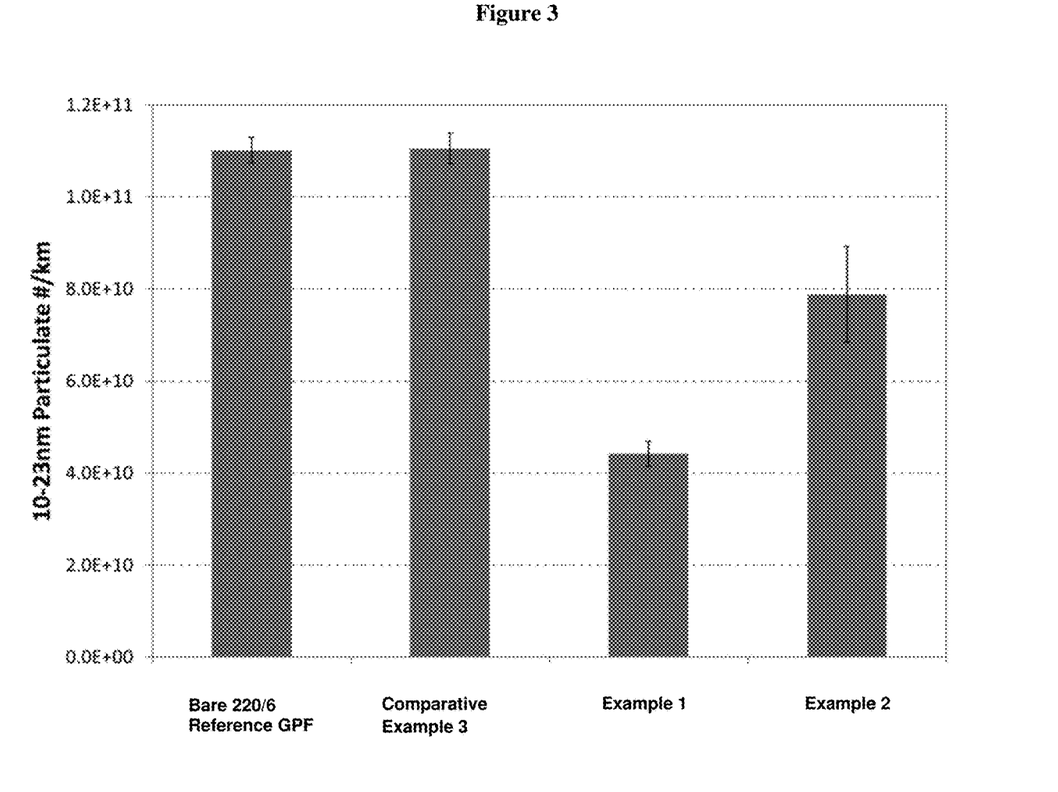
FIG. 3 shows particulate emissions and specifically those between 10 and 23 nm for exemplary catalyst articles, in particular, simulated WLTC engine bench data for 10-23 nm particulate count in #/km.

The results shown in FIG. 3 were an average of 3 WLTC tests completed for each example. The results show the benefit of Examples 1 and 2 in comparison to the uncoated low porosity 220/6 GPF and Comparative Example 3. Particularly, Example 1 gives a much improved benefit over the currently available alternatives.

Table 1 below demonstrates additional reduced backpressure benefit of Example 1 and Example 2 vs. Comparative Example 3.

TABLE 1

| Sample | Cold Flow BP at 600 m$^3$/hr (mbar) |
| --- | --- |
| Bare 220/6 | 44.1 |
| Comparative Example 3 | 65.7 |
| Example 1 | 63.0 |
| Example 2 | 56.4 |

We claim:

1. A catalyst article for treating an exhaust gas from a positive-ignition internal-combustion engine, the article comprising:
  a substrate which is a wall-flow filter having an inlet end and an outlet end and an axial length L therebetween, a plurality of inlet channels extending from the inlet end and a plurality of outlet channels extending from the outlet end,
  wherein the plurality of inlet channels comprise a first catalyst composition extending from the inlet or outlet end for at least 50% of L and the plurality of outlet channels comprise a second catalyst composition extending from the outlet or inlet end for at least 50% of L, wherein the first and second catalyst compositions overlap by at most 80% of L,
  wherein the first and second catalyst compositions each independently comprise an oxygen storage component (OSC) derived from a CeZr mixed oxide sol having a D90 of less than 1.0 micron and a particulate inorganic oxide having a D90 of from 1 to 20 microns.

2. The catalyst article of claim 1, wherein the CeZr mixed oxide sol has a Z-average particle size of between 230 and 310 nm.

3. The catalyst article of claim 1, wherein the first and second catalyst compositions overlap by at most 20% of L.

4. The catalyst article of claim 1, wherein the first and second catalyst compositions overlap by at most 10% of L.

5. The catalyst article of claim 1, wherein the CeZr mixed oxide sol has a weight ratio of $ZrO_2$ to $CeO_2$ of about 2:1.

6. The catalyst article of claim 1, wherein the particulate inorganic oxide is selected from the group consisting of alumina, magnesia, silica, lanthanum, neodymium, praseodymium, yttrium oxides, and mixed oxides or composite oxides thereof.

7. The catalyst article of claim 1, wherein the first and/or second catalyst composition further comprises a platinum group metal (PGM) component, preferably selected from the group consisting of platinum, palladium, rhodium, and a mixture thereof.

8. The catalyst article of claim 1, wherein the first and/or second catalyst composition further comprises an alkali or alkaline earth metal component.

9. The catalyst article of claim 1, wherein the first and second catalyst compositions are the same.

10. The catalyst article of claim 1, wherein the first and/or second catalyst composition have a weight ratio of the OSC to the particulate inorganic oxide of from 3:1 to 1:3.

11. The catalyst article of claim 1, wherein the first and/or second catalyst compositions are provided directly on the substrate.

12. An exhaust gas treatment system comprising the catalyst article of claim 1 in fluid communication with an exhaust manifold of a positive ignition engine.

13. A method of treating exhaust gas emitted from a positive ignition internal combustion engine, the method comprising contacting the exhaust gas with the catalyst article of claim 1.

14. Use of the catalyst article of claim 1 in an exhaust gas treatment system for reducing the emission of particles smaller than 23 nm.

* * * * *